United States Patent [19]

Shyue et al.

[11] Patent Number: 5,404,379
[45] Date of Patent: Apr. 4, 1995

[54] TIMING RECOVERY METHOD AND SYSTEM

[75] Inventors: Sammy Shyue, Chungli; Ching-Hsiang Lin, Hsinchu; Ji-Shang Yu, Taipei; Yen-Chun Lin, Tou-Fen, all of Taiwan, Prov. of China

[73] Assignee: Industrial Technology Research Institute, Chutung, Hsinchu, Taiwan, Prov. of China

[21] Appl. No.: 894,030

[22] Filed: Jun. 5, 1992

Related U.S. Application Data

[63] Continuation-in-part of Ser. No. 646,868, Jan. 28, 1991, abandoned.

[51] Int. Cl.⁶ .............................................. H04L 7/00
[52] U.S. Cl. .................................... 375/354; 375/75; 375/239; 327/91; 327/155
[58] Field of Search ................ 375/96, 106, 119, 120, 375/24, 11, 14, 94; 307/510, 514, 517, 523; 328/109, 151, 63

[56] References Cited

U.S. PATENT DOCUMENTS

| | | | |
|---|---|---|---|
| 4,061,978 | 12/1977 | Motley et al. | 375/14 |
| 4,692,931 | 9/1987 | Ohsawa | 375/106 |
| 4,755,795 | 7/1988 | Page | 340/347 AD |
| 4,794,341 | 12/1988 | Barton et al. | 375/94 |
| 4,815,103 | 3/1989 | Cupo et al. | 375/106 |
| 4,847,864 | 7/1989 | Cupo | 375/14 |
| 4,866,739 | 9/1989 | Agazzi et al. | 375/106 |
| 4,905,101 | 2/1990 | Ohta et al. | 341/110 |
| 5,018,166 | 5/1991 | Tjahadi et al. | 375/106 |
| 5,309,482 | 5/1994 | Wright et al. | 375/106 |

FOREIGN PATENT DOCUMENTS

| | | |
|---|---|---|
| 0173569 | 3/1986 | European Pat. Off. . |
| 0176029 | 4/1986 | European Pat. Off. . |
| 0222593 | 5/1987 | European Pat. Off. . |
| 0262843 | 4/1988 | European Pat. Off. . |

OTHER PUBLICATIONS

Stark, "Introduction to Numerical Methods", Macmillan Pub. Co., pp. 30–38.
Campbell, "Calculus with Analytical Geometry," Prindle, Weber & Schmidt, Inc., pp. 385–505.
L. W. Couch II, "Digital and Analog Communication Systems" third ed pp. 9095, 346–348.
E. A. Lee and D. G. Messerschmidt, "Digital Communication" pp. 173–176.
M. S. Roden, "Digital Communications System Design", pp. 85–89.
Martin Oerder et al.: "VLSI Implementation of Synchronization Algorithm in a 100 Mbit/s Digital Receiver", Proceedings IEEE Global Telecommunications Conference, vol. 1, Dec. 2, 1990, San Diego, pp. 589–593.

Primary Examiner—Tesfaldet Bocure
Attorney, Agent, or Firm—Meltzer, Lippe, Goldstein, Wolf, Schlissel & Sazer

[57] ABSTRACT

An apparatus and method for receiving a continuous time pulse amplitude-modulated passband signal is disclosed. The pulse amplitude modulated signal is periodically sampled by a local clock to generate received samples. A convolution of the received samples and an impulse response function is evaluated at a particular value of a phase difference variable to derive corrected samples. Using a narrow transmission band filter, a periodic signal is derived from the corrected samples. The periodic signal has a period equal to a symbol period of the pulse-amplitude modulated signal. Successive samples in each period of the periodic signal are compared to determine if the corrected samples lag or are ahead of optimal samples. If the corrected samples lag or are ahead of the optimal samples, the phase difference variable used to evaluate the convolution is varied by a fixed discrete stepsize.

5 Claims, 5 Drawing Sheets

4-PSK

16-QAM

FIG. 7   V(d) UNIPOLAR RZ
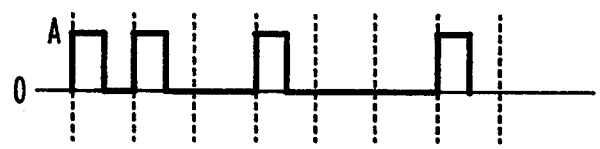
FIG. 8
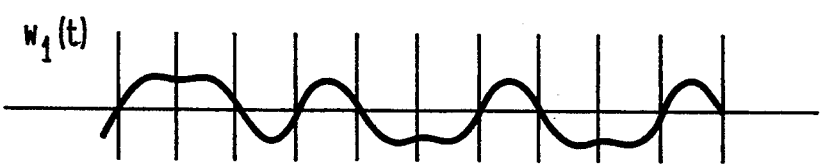
FIG. 9
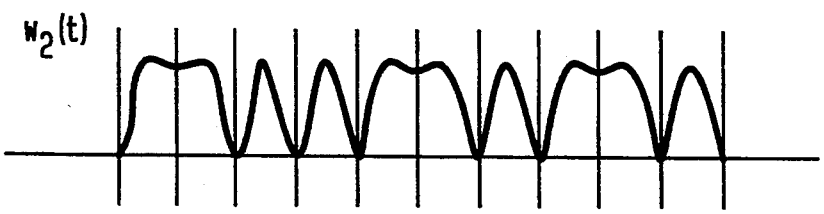
FIG. 10
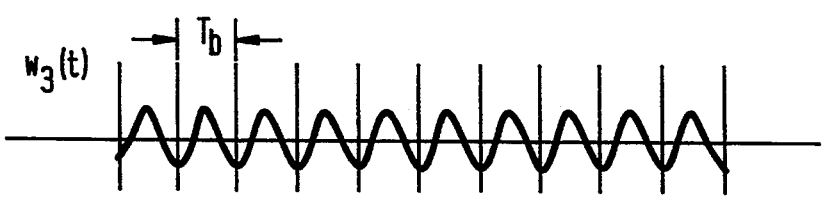

TIMING RECOVERY METHOD AND SYSTEM

RELATED APPLICATION

The present invention is a continuation-in-part of U.S. patent application Ser. No. 646,868, filed Jan. 28, 1991, now abandoned.

FIELD OF THE INVENTION

The present invention relates to a timing recovery method and system for a communication system which utilizes pulse amplitude modulation (PAM).

BACKGROUND OF THE INVENTION

At a receiver in a typical communication system, an analog-to-digital converter is utilized to convert a received continuous time signal into a discrete-time format. One problem which is encountered in this type of system is that the local receiver clock and the remote transmitter clock are asynchronous. If the receiver clock is slower than the transmitter clock, after a long enough period of time, one sample of the received continuous time signal will be lost. On the other hand, if the local receiver clock is faster than the remote transmitter clock, after a long enough period of time, an extra sample of the received continuous time signal will be obtained. The problem of synchronizing the local receiver clock to the remote transmitter clock is an important problem in many telecommunication systems. The present invention solves this problem in a communication system which utilizes pulse amplitude modulation.

PAM is discussed in some detail below to facilitate the understanding of the present invention. First baseband PAM is discussed and then passband PAM is discussed.

Baseband PAM is commonly used for metallic media, such as twisted wire pairs, where the signal spectrum is allowed to extend down to zero frequency (d.c.).

The PAM system is extended to passband transmission by introducing a sinusoidal carrier signal. Passband PAM is commonly used with transmission media with a highly constrained bandwidth such as radio. It uses two sinusoidal carrier signals of the same frequency, but with a ninety degree phase difference, which are modulated by the real and imaginary parts of a complex-valued baseband signal. Special cases of passband PAM are the commonly used phase-shift keying (PSK), amplitude and phase modulation (AM-PM) and quadrature amplitude modulation (QAM). See, for example, Edward A. Lee and David G. Mesershmitt, "Digital Communication", 1988, Kluwer Academic Publishers, Boston (hereinafter "Lee et al.") page 146.

A baseband communication system is shown in FIG. 1 (see Lee et al, page 148). The baseband system 10 of FIG. 1 includes a transmitter 12 and a receiver 14. At the transmitter 12, an incoming stream of bits $B_k$ is coded by a coder 16 into a stream of symbols $A_k$.

While a bit can only assume the values of "0" or "1", a symbol assumes values from a predetermined alphabet of symbols. The alphabet is the set of symbols that are available for transmission. A baseband signal has a real-valued alphabet that is simply a list of real numbers, for example $A_k$ assumes values from the alphabet $\{-3, -1, +1, +3\}$. The coder 16 in the baseband transmitter 12 can, for example, map pairs of bits from the set $\{00, 01, 10, 11\}$ into one of four levels from the alphabet $\{-3, -1, 1, 3\}$.

Because the coder 16 may map multiple bits into a single data symbol, there is a distinction between the "symbol rate" and the "bit rate". The "symbol rate" is also called the "baud rate". If for example, the coder maps two bits into each symbol, the symbol rate is one-half of the bit rate.

After being generated by the coder 16, the symbols $A_k$ are applied to a transmit filter 18. The transmit filter 18 produces a continuous-time signal s(t) for transmission over the continuous time channel 20.

The impulse response g(t) of the transmit filter 18 is called the pulse shape. The output s(t) of the transmit filter 18 is the convolution of the pulse shape and symbol sequence $$s(t) = \sum_{k=-\infty}^{k=\infty} A_k g(t - kT_b) \quad (1)$$

where $f_b = 1/T_b$ is the baud rate. This signal can be interpreted as a sequence of possibly overlapped pulses with the amplitude of each pulse determined by a symbol. Such signals are termed pulse amplitude modulated (PAM) signals regardless of the pulse shape.

Baseband PAM and its generalization to passband are among the most common signaling methods. A variety of techniques including QAM, PSK, BPSK, PRK, QPSK, DPSK and AM-PM are special cases of PAM. See Lee et al, pages 149-150.

At the receiver 14, the signal R(t) which is received via the channel 20 is processed by a receiver filter 21 with an impulse response f(t) to produce the output signal Q(t). The received signal R(t) is also processed by a timing recovery circuit 22 which recovers a clock for use by the sampler 24. The signal Q(t) is sampled by the sampler circuit 24. The samples $Q_k$ outputted by the sampler 24 are processed by a decision device 26 to form the reconstructed symbols $\hat{A}_k$. Then the symbols are decoded by a decoder 28 to form the reconstructed bit stream $\hat{B}_k$.

Few practical communication channels can transmit baseband signals. Most physical transmission media are incapable of transmitting frequencies at d.c. and near d.c. which are contained in baseband signals.

The passband strategy is now considered. The passband strategy is considered using a discrete time signal representation.

The passband strategy is to construct a signal s(nT) where s(nT) is the discrete time analog to s(t) and where 1/T is the sampling rate. The signal s(nT) is in this case complex and contains information in both its real and imaginary parts. The signal s(nT) is modulated using a complex-valued carrier to obtain a modulated signal z(nT). A transmitter 30 for accomplishing this is schematically illustrated in FIG. 2 (see Lee et al, page 170). In the transmitter 30, the bits $b_k$ are processed by a coder 32 to produce the complex symbols $a_k = a(kT)$ where $f_s = 1/T$ is the sampling frequency. The passband PAM signal has an alphabet that is a list of complex numbers, for example, $\{-1, -j, +1, +j\}$. For an alphabet with M=4 symbols, each symbol can represent $\log_2 M = 2$ bits. A complex-valued alphabet is best described by plotting the alphabet as a set of points in a complex plane. Such a plot is called a signal constellation. Two popular constellations are illustrated in FIG. 3A and FIG. 3B. Returning now to FIG. 2, the complex symbols a(kT) are processed by the transmit filter 34. In a discrete-time representation, the transmit filter 34 of FIG. 2 has a transfer function h(nT). The output of the transmit filter 34 is the complex baseband signal $$s(nT) = \sum_{k=-\infty}^{\infty} a(kT)h((n-k)T).$$

The complex baseband signal s(nT) is then multiplied in the modulator 38 by a complex valued carrier:

$$e^{i\omega cnT} = \cos(\omega_c nT) + j\sin(\omega_c nT) \qquad (3)$$

where $\omega_c$ is the carrier frequency. The modulator 38 thus outputs the complex modulated signal $$z(nT) = s(nT)e^{i\omega cnT} \qquad (4)$$

The signal z(nT) is complex valued, so that it cannot be transmitted over a real-valued channel. However, all of the signal information is contained in the real part of the signal, which can be transmitted over a real-valued channel. Thus the circuit 39 is used to obtain $x(nT) = \sqrt{2}Rez(nT)$. The $\sqrt{2}$ factor insures that the power of x(nT) is the same as the power in s(nT).

Timing in the discrete-time transmitter 30 of FIG. 2 is controlled by a transmitter clock (not shown).

The signal x(nT) is processed by the digital-to-analog converter 40 to convert to a continuous-time signal x(t) for transmission to a remote receiver via a transmission channel 41. It should be noted that the function z(nT) is analytic, i.e., its Fourier transform contains no negative frequency components.

The signal x(nT) may be represented as $$x(nT) = \sqrt{2}\left\{\cos(\omega_c nT) \sum_k Re\ a(kT)h(nT-kT)\right\} - \sqrt{2}\left\{\sin(\omega_c nT) \sum_k Im\ a(kT)h(nT-kT)\right\} \qquad (5)$$

This indicates that the signal x(nT) is equal to two real-valued baseband PAM signals $$s_r(nT) = \sqrt{2}\ \Sigma Re\ a(kT)h((n-k)T) \qquad (6a)$$

$$s_i(nT) = \sqrt{2}\ \Sigma Im\ a(kT)h((n-K)T) \qquad (6b)$$

modulated by the carrier signals $\cos(\omega_c nT)$ and $-\sin(\omega_c nT)$ respectively. These two carriers are 90 degrees out of phase with one another so that they are said to be in quadrature, where $\cos(\omega_c nT)$ is called the in-phase component and $\sin(\omega_c nT)$ is called the quadrature component.

FIG. 4 shows an alternative embodiment for the transmitter shown in FIG. 2 (see Lee et al, page 172). In the transmitter 50 of FIG. 4, bit stream $b_k$ is processed by a coder 51 to form the real symbol streams Re{$a_k$} and Im{$a_k$}. Each symbol stream is processed by a transmit filter 52 with a transfer function $\sqrt{2}h(nT)$ to form the first and second baseband signals $s_r(nT)$ and $s_i(nT)$. The first baseband signal is then multiplied by the carrier $\cos(\omega_c nT)$ in the modulator 53 and the second baseband signal is multiplied by the carrier $\sin\omega_c nT$ in the modulator 54. The signals are then combined using the subtractor element 55 to form the passband signal x(nT). This signal is converted to the analog signal x(t) by the digital-to-analog converter 56.

In an illustrative example, the sample rate $f_s = 1/T = 7200$ Hz. The symbol rate $f_b = 1/T_b$ is illustratively 2400 symbols per sec. The bit rate may be 9600 bits/sec or 4800 bits/sec. The carrier frequency $f_c = \omega_c/2\pi$ is illustratively 1800 Hz.

It is an object of the present invention to provide a receiver for receiving the signal x(t) after it is transmitted to a remote location via a transmission channel. More particularly, it is an object to provide such a receiver which operates utilizing digital signal processing. In such a case it is necessary to sample the continuous-time signal which is transmitted via the channel to the receiver. Because the local clock which samples the received signal at the receiver may not be synchronized with the transmitter clock, the receiver must include some technique for local clock synchronization. It is a further object of the present invention to provide such a local clock synchronization technique.

SUMMARY OF THE INVENTION

In accordance with an embodiment of the present invention, a receiver for receiving a continuous-time pulse amplitude modulated (PAM) passband signal comprises an analog-to-digital converter for sampling the continuous-time PAM passband signal using a local clock to generate received samples. The received samples are then corrected for any asynchronism between the local receiver clock and a remote transmitter clock. In other words, the timing utilized at the transmitter is locally recovered at the receiver. To recover the transmitter timing at the receiver, a timing adjustment filter evaluates a convolution of the received samples obtained using the local clock and an impulse response function at a particular value of a phase difference variable. The timing adjustment filter outputs corrected samples. A corrected sample is an optimum sample when the corrected sample is obtained at the optimum value of the phase difference variable. At the optimum value of the phase difference variable, there is synchronization between the local and remote clocks.

The value of the phase difference variable used to evaluate the convolution is obtained using a feedback technique as follows. A periodic signal is derived from the corrected samples generated by the timing adjustment filter. This signal is illustratively a sinusoidal signal at the symbol rate. Starting from an initial value of the phase difference variable, a timing difference detector compares, during each period of the periodic signal, successive samples of the periodic signal, to determine whether the corrected samples are ahead of or lag behind the optimal samples. The phase difference variable is increased or decreased by a fixed discrete stepsize in each period of the periodic signal until the optimum value of the phase difference variable is reached and the corrected samples are optimum samples. In this manner, synchronization between the local and remote clocks is achieved.

BRIEF OF THE DRAWING

FIG. 1 schematically illustrates a baseband PAM system.

Figure 5:
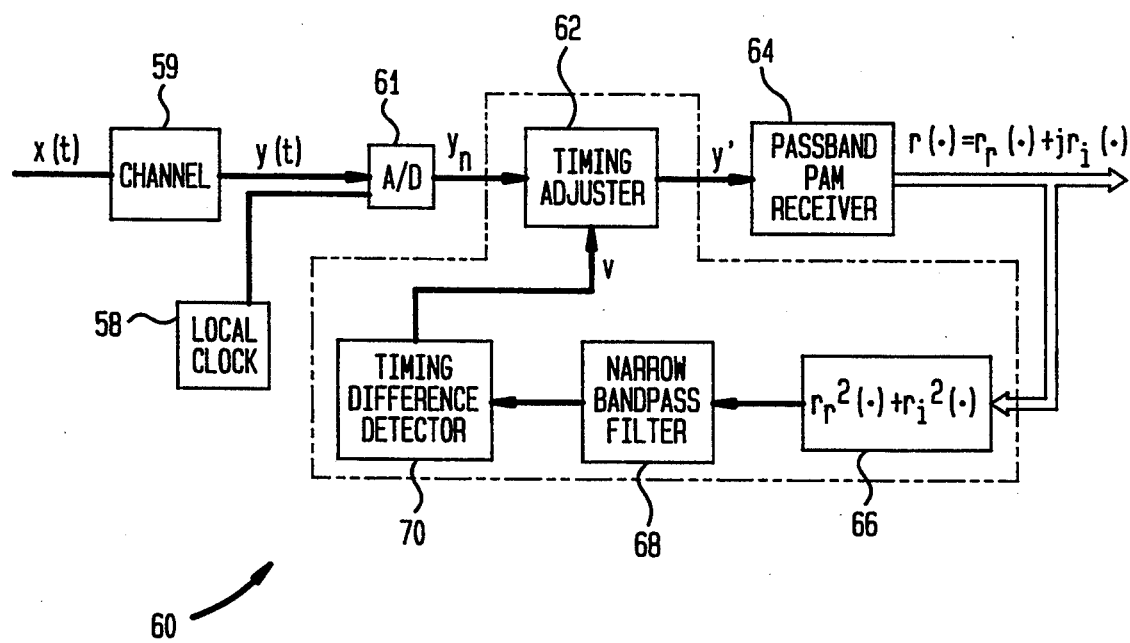
FIG. 5 and FIG. 6 illustrate a PAM passband receiver in accordance with an illustrative embodiment of the present invention.

FIGS. 7, 8, 9, 10, 11(a), 11(b) and 11(c) illustrate certain signals utilized in the receiver of FIG. 5.

DETAILED DESCRIPTION OF THE INVENTION

Figure 1:
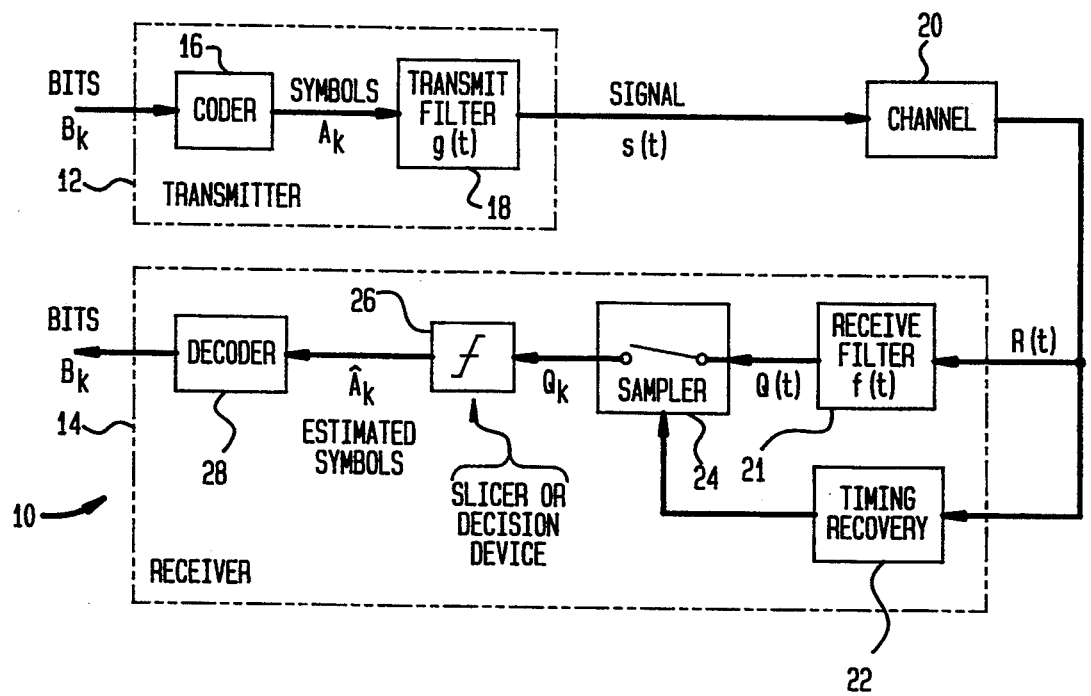
Figure 2:
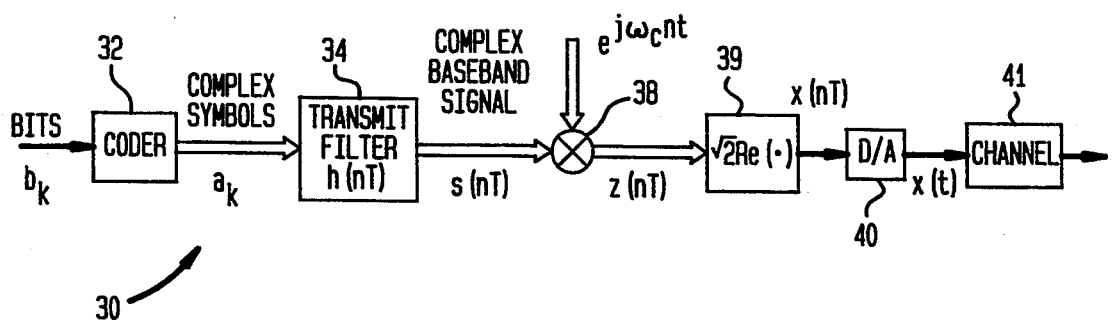
FIG. 2 illustrates a PAM passband transmitter.
Figure 3A:
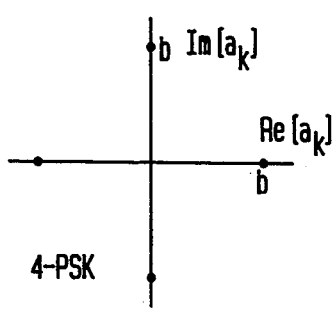
FIGS. 3A and 3B illustrate symbol alphabets utilized in passband PAM.
Figure 3B:
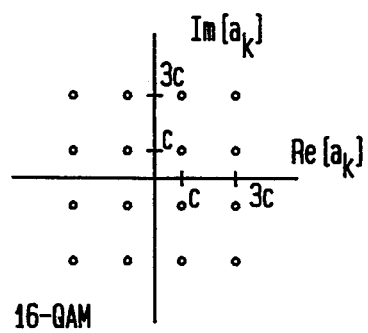
Figure 4:
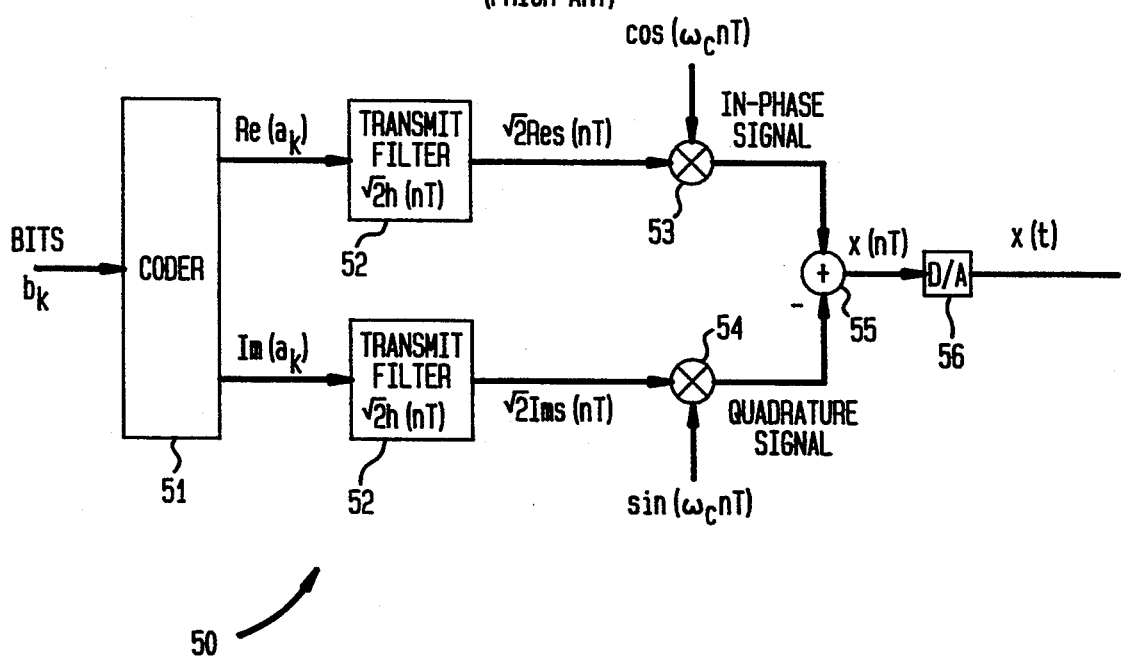
FIG. 4 illustrates an alternative PAM passband transmitter.

A receiver 60 in accordance with the present invention is illustrated in FIG. 5. The continuous-time signal x(t), which is generated by the transmitter (see FIG. 3 and FIG. 5) and transmitted by a channel 59 with a particular transfer characteristic, is received at the receiver 60 of FIG. 5 as the continuous-time signal y(t). The signal y(t) is sampled by an analog-to-digital converter 61 at the sampling rate $f_s = 1/T$ at times determined by a local clock 58 to generate the samples $y_n = y(nT)$. The samples y(nT) are then processed by a timing adjuster 62 which generates the corrected samples $y'_n$.

According to the well known sampling theorem, the transmitted continuous-time PAM passband signal y(t) may be reconstructed from the following equation:

$$y(t) = \sum_{n=-\infty}^{n=\infty} y_n \sin\{\pi f_s[t - nT]\}/\pi f_s[t - nT] \quad (7)$$

where y(t) is band limited to B Hz and $1/T = f_s \geq 2B$. Illustratively, B is 3000 Hz. In a real system, it is not possible to use an infinite number of samples to reconstruct the continuous-time waveform, rather, it is only possible to use 2N+1 values of y(nT), where N is a finite integer. In the time range $(n-N)T \leq t \leq (n+N)T$, the waveform y(t) may be approximated by the equation $$y(t) \approx y(v) = \sum_{p=n-N}^{p=n+N} y_p I_n'(v - pT) \quad (8)$$

where $I_n'(t)$ is the raised cosine function $$I_n'(t) = \{\cos \pi a t f_s\} \{\sin c t f_s\}/\{1 - (2a t f_s)^2\}$$

with $\sin c(t f_s) = \sin(\pi t f_s)/\pi t f_s$

The parameter a is known as the roll-off factor and is illustratively equal to 0.1. The variable v is a time variable equal to $nT + \tau$ in equation 8.

Equation (8) may be rewritten $$y'_n = y(nT + \tau) = \sum_{p=n-N}^{p=n+N} y_p I_n'(nT + \tau - pT) \quad (9a)$$

$$= \sum_{p=n-N}^{p=n+N} y_p I_n'((n - p)T + \tau) \quad (9b)$$

Let $n - p = i$. Then $$y'_n = y(nT + \tau) = \sum_{i=N}^{i=-N} y_{n-i} I_n'(iT + \tau) \quad (9c)$$

The variable T is called the phase difference variable because it reflects the phase difference between the corrected sample $y'_n = y(nT + \tau)$ and the uncorrected received sample y(nT) obtained by the local clock. From equations (9), it is known that the convolution of equation (8) can be evaluated at a particular value of the phase difference variable $\tau$ to obtain the corrected sample $y'_n$. When $\tau = \tau_0$, where $\tau_0$ is the optimum phase difference, the corrected sample $y'_n$ is an optimum sample.

The timing adjuster 62 of FIG. 5 is a filter which evaluates the convolution of equation (8) at particular values of the variable $v = nT + \tau$ obtain corrected samples $y'_n$. The value of the phase difference variable $\tau$ is determined by the timing difference detector 70. The timing difference detector 70 adjusts the value of $\tau$ until the optimum value $\tau_0$ is reached. The operation of the timing difference detector 70 is discussed below.

Figure 6:
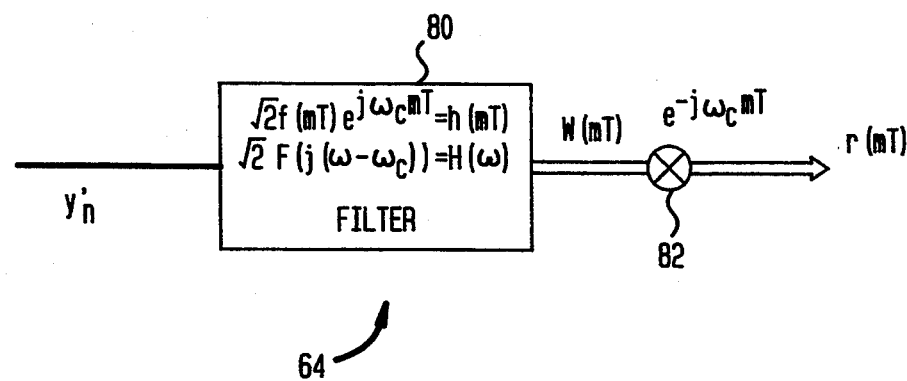

As shown in FIG. 5, the corrected samples $y'_n$, outputted by the timing adjuster 62, are processed by the passband PAM receiver 64. The operation of the passband PAM receiver 64 is shown in greater detail in FIG. 6. The samples $y'_n$ are processed by a filter 80 with an impulse response function $h(mT) = \sqrt{2} f(mT) e^{j\omega_c mT}$, or in the frequency domain $H(\omega) = \sqrt{2} F(j(\omega - \omega_c))$. Because the impulse response is complex, two real filters with impulse responses Re{h(mT)} and Im{H(mT)} are required for the implementation. Preferably, the receiver filter 80 passes no negative frequencies. This means that the output signal $$w(mT) = \sum_n y'_n h((m - n)T) \quad (10)$$

contains no negative frequency components. Illustratively, the filter f(mT) is a simple low pass filter with unity gain in the passband. The signal w(mT) is multiplied by the factor $e^{-j\omega_c mT}$ in the demodulator 82 to produce the output signal $r(mT) = r_r(mT) + j r_i(mT)$.

It is clear that for a noiseless distortionless transmission channel $s(nT) = r(mT)$ when $m = n$.

As indicated above, the timing adjuster 62 of FIG. 5 is a filter which evaluates the convolution of equation (8) at a particular value of the variable $v = nT + \tau$. A symbol synchronization technique is used to choose a value of the phase difference variable $\tau$.

FIG. 7 shows a waveform with a unipolar RZ format (in a continuous-time representation). The power spectrum density of this signal has a delta function at the symbol rate. Consequently, the symbol clock signal can be obtained by passing the unipolar RZ waveform through a narrow-band pass filter that is tuned to the symbol rate. However, in general, the output of the passband PAM receiver 64 of FIG. 5 does not have a unipolar RZ format. In this case it is necessary to convert the output of the passband PAM receiver 64 into the unipolar RZ waveform. For example, the output of the passband PAM receiver 64 might have a polar NRZ format. The polar NRZ format is shown in FIG. 8 in a continuous-time representation. (The continuous-time representation is used in FIG. 8 for purposes of clarity. However, because the receiver 64 of FIG. 5 utilizes digital signal processing, the output of the receiver 64 is in reality a sequence of samples at the sampling rate.) A square-law circuit may be used to convert the output of the passband PAM receiver into the RZ unipolar format. Thus, in the receiver of FIG. 5, a square law circuit 66 computes $r_r^2(mT) + r_i^2(mT)$. The output of the square law circuit 66 is shown in FIG. 9 (in a continuous time representation for purposes of clarify). Then, a narrow bandpass filter 68 that is tuned to the symbol frequency filters the output signal of the square law circuit 66. Thus, the output of the narrow band pass filter 70 is a symbol clock signal that has positive peaks at the optimum sampling time and is symmetric on either side, for example, a sinusoidal signal with a frequency $f_b = 1/T_b$ equal to that of the symbol clock, i.e., $\cos(2\pi f_b mT + \Phi)$. Such a signal (in a continuous-time representation for purposes of clarity) is shown in FIG.

10 (see Leon W. Couch II, "Digital Analog Communication Systems", Third Edition, 1990, McMillan Publishing Co., New York, page 157).

The timing difference detector 70 of FIG. 5 receives the clock signal outputted by the narrow bandpass filter 68 and determines a value for $\tau$ to be used in the timing adjuster 62 for evaluating the convolution of equation (8). More particularly, the values of the phase difference variable $\tau$ are chosen by the timing difference detector 70 for evaluating the convolution of equation 8 to obtain $Y'_n$ so as to cause the corrected samples ($y'_n$) to more closely approach the optimum samples. It should be noted that when the corrected samples are optimum samples, $\tau \rightarrow$ constant. When this circumstance prevails, it means the local and remote clocks are synchronous.

The corrected samples $y'_n$ are called optimum samples when the phase difference variable $\tau$ has the optimum value $\tau_0$. The time variable $v = nT + \tau_0$ used to evaluate the convolution of equation (8) to obtain the optimum samples is called the optimum sampling time (for a passband signal) and $\tau_0$ is said to be the optimum phase difference. A symbol sample $r(mT)$ obtained at the output of the PAM receiver 64 of FIG. 5 at the optimum sampling time (e.g., which results in a symbol clock signal with positive peaks at 2400 Hz) is easily processed to identify which symbol from the alphabet is transmitted at the transmitter.

Figure 11A:
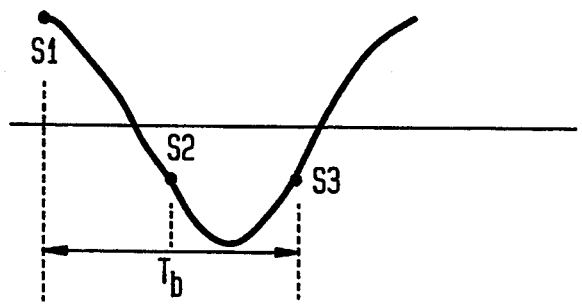

Because the sampling rate $1/T$ is illustratively three times the symbol rate $R = 1/T_b$, there are three samples of the periodic symbol clock signal outputted by the filter 68 of FIG. 5 in one period of duration $T_b$. If the corrected samples are optimum samples, the corresponding symbol clock signal is shown in FIG 11(a), which is an enlarged portion of one period of duration $T_b$ of the signal of FIG. 10. If none of the corrected samples is an optimum sample, the corresponding symbol clock signal is illustrated in FIG. 11(b) or FIG. 11(c).

Figure 11B:
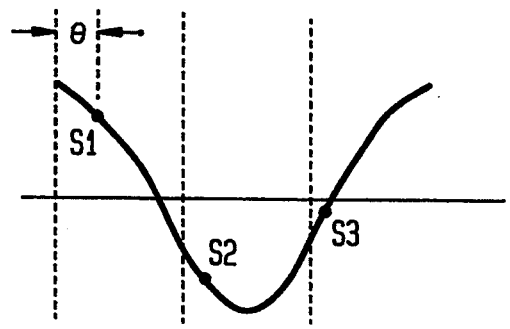
Figure 11C:
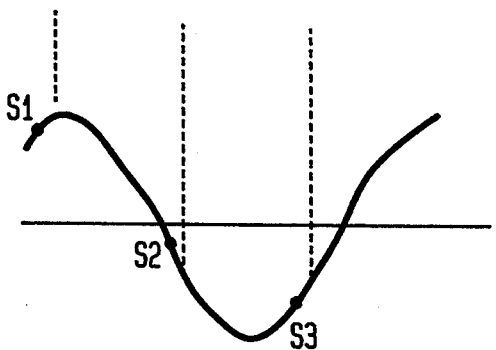

Thus, FIG. 11(a) shows the symbol clock signal when the corrected samples are optimum samples, FIG. 11(b) shows the symbol clock when the corrected samples lag behind the optimum samples and FIG. 11(c) shows the symbol clock when the corrected samples lead the optimum samples.

The operation of the timing difference detector 70 is now considered.

The local receiver clock is said to be synchronous to the transmitter clock if the local receiver clock has a precise frequency and phase relationship with respect to the received input signal, and it is delayed when compared to the clock at the transmitter since there is a propagation delay through the channel. In other words, the local receiver clock is synchronized to the input symbol stream at the transmitter.

If the local and remote clocks are synchronized, the symbol clock signal will be that of FIG. 11(a) where $S2 \approx S3$. In this case, the phase difference $\tau$ approximates a constant and the $\theta$ value is approximately zero.

An initial value for $\tau$ is obtained in the timing difference detector 70 from the value of $\theta$ in FIG. 11(b) which separates S1 and the peak of the cosine wave. Thus, as can be seen from FIG 11(b)

$$-\theta/120° = \tau/T \quad (11)$$

$$S1 = A \cos \theta \quad (12)$$

$$S2 = A \cos (\theta + 120°) \quad (13)$$

By eliminating A (the amplitude of the sinusoidal signal) from equations 12 and 13, the following equation for $\theta$ is then obtained $$\tan \theta = -\{2/\sqrt{3}S1\}\{S1/2 + S2\} \quad (14)$$

An initial value of $\tau$ is then obtained from equation (11).

After the initial value of the phase difference $\tau$ is calculated, the $\tau$ value is adjusted once during every symbol rate interval $T_b = 3T$. The adjustment takes place until synchronization is achieved and $\tau \rightarrow$ constant. If $S3 > S2$ in a particular period $T_b$, it means that the corrected samples lag behind the optimum samples and $\tau$ should be adapted such that $\tau \rightarrow \tau - \Delta\tau$ where $\Delta\tau$ is a fixed discrete stepsize. If $S3 < S2$ it means the corrected samples lead the optimum samples and $\tau$ should be adapted such that $\tau \rightarrow \tau + \Delta\tau$.

It should be noted that this technique of adjusting $\tau$ does not indicate whether the local receiver clock is too slow or too fast relative to the remote clock. However, in general, when the local clock is slower than the remote clock, it is more likely that $S3 > S2$ than $S3 < S2$. When the local clock is faster than the remote clock, it is more likely that $S3 < S2$ than $S3 > S2$.

The asynchronization problem as described above, will result in one sample of the received signal being lost if the local clock is too slow or in an extra sample of the received signal being obtained if the local clock is too fast.

More particularly, if $\tau$ is smaller than a predetermined limit, such as if $\tau < -0.875$, it means that the local receiver clock is slower than the remote transmitter clock and one corrected sample (i.e., the input to the subsequent passband PAM receiver) will be lost. To correct this, first the phase difference variable used to evaluate equation (8) is changed to $\tau \rightarrow \tau + 1.0$. Second, before the next received sample is fed to the timing adjuster, the new phase difference variable $\tau$ is used to evaluate the convolution of equation 8 to generate an additional corrected sample.

If $\tau$ is larger than a predetermined limit, such as $\tau > 0.875$, it means that the local receiver is faster than the remote transmitter clock and one extra corrected sample data will be obtained. To correct this, the next received sample is processed by the timing adjuster, and the corrected sample generated by the convolution of equation (8) is discarded. Second, the phased difference variable used to evaluate equation (8) is changed to $\tau \rightarrow \tau - 1.0$.

It should be noted that for each value of $\tau$ produced by the timing difference detector 70, $2N+1$ values of the raised cosine function are needed by the timing adjuster filter 62 to evaluate the convolution of equation (8). One approach to evaluate the raised cosine function is to store in memory tables of the raised cosine function. However, a drawback to this approach is that a large memory capacity would be required. An alternative to this approach is to store in memory a finite set of values of the raised cosine function and then use a Taylor series to evaluate the raised cosine function at other values.

In the foregoing discussion, the inventive receiver of FIG. 5 has been viewed as comprising a plurality of interconnected circuit elements. While this is one approach to implement the inventive receiver, in another approach the receiver may be implemented through use of a single digital signal processor or microprocessor which implements the functions shown in FIG. 5 under software control.

Finally, the above-described embodiments of the invention are intended to be illustrative only. Numerous alternative embodiments may be devised by those skilled in the art, without departing from the spirit and scope of the following claims.

It is claimed:

1. An apparatus for receiving a continuous-time pulse amplitude modulated passband signal comprising
    sampling means for periodically sampling said received continuous-time pulse amplitude modulated signal under the control of a local clock at a sampling rate to generate received samples,
    timing adjustment means for evaluating a convolution of said received samples and an impulse response function at particular value of a phase difference variable to obtain corrected samples,
    means including a narrow passband filter for deriving from said corrected samples a signal component having a period equal to a symbol period of said pulse amplitude modulated signal, and
    timing difference detector means for comparing successive samples of said signal component outputted by said deriving means to determine in each symbol period whether said corrected samples are ahead of or lag behind optimal samples and for varying said phase difference variable used to evaluate said convolution by a fixed discrete stepsize in each symbol time period if said corrected samples are ahead of or lag behind said optimal samples.

2. The apparatus of claim 1, further comprising,
    a passband pulse amplitude modulation receiver connected to an output of said timing adjustment means and having at least one output signal,
    means for processing said signal outputted by said passband pulse amplitude modulation receiver to convert the signal to a unitary polar format, and
    wherein said narrow passband filter further having a symbol frequency for filtering said signal with a unitary polar format for deriving said signal component whose period is the symbol period.

3. An apparatus for receiving a pulse amplitude modulated signal comprising
    sampling means for sampling said pulse amplitude modulated signal at a sampling rate for generating received samples,
    timing adjustment means for evaluating a convolution of said received samples and an impulse response function at a particular value of a phase difference variable to obtain corrected samples,
    means including a filter with a narrow transmission band at a symbol frequency of said pulse amplitude modulated signal for deriving from the corrected samples a periodic signal at said symbol frequency, and
    timing difference detection means for determining once during each period of the periodic signal if the phase difference variable used to evaluate the convolution is too large or too small and for varying the phased difference variable by a fixed discrete stepsize if the phase difference variable is too large or too small.

4. The apparatus of claim 3 wherein said timing difference detection means compares successive samples of the periodic signal in each period thereof to determine if said corrected samples are ahead of or lag behind optimal samples and varies the phase difference variable utilized to evaluate the convolution by said discrete stepsize in each symbol time period if the corrected samples are ahead of or lag behind the optimal samples.

5. A method for receiving a pulse amplitude modulated signal comprising the steps of:
    periodically sampling said pulse amplitude modulated signal to generate received samples,
    electronically evaluating a convolution of said received samples and an impulse response function at a particular value of a phase difference variable to obtain corrected samples,
    using a narrow transmission band filter, electronically deriving from said corrected samples a periodic signal having a period equal to a symbol period of said pulse amplitude modulated signal, and
    electronically comparing successive samples in each period of said periodic signal to determine if the corrected samples are ahead of or lag behind optimal samples and, if the corrected samples are ahead of or lag behind optimal samples, varying he phase difference variable used to evaluate the convolution by a fixed discrete stepsize.

* * * * *